US012707075B2

(12) United States Patent
Wenger

(10) Patent No.: US 12,707,075 B2
(45) Date of Patent: Aug. 11, 2026

(54) REQUIRED SUPPLEMENTARY ENHANCEMENT INFORMATION MESSAGES THROUGH PROFILE

(71) Applicant: TENCENT AMERICA LLC, Palo Alto, CA (US)

(72) Inventor: Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/889,642

(22) Filed: Sep. 19, 2024

(65) Prior Publication Data

US 2025/0106420 A1 Mar. 27, 2025

Related U.S. Application Data

(60) Provisional application No. 63/539,776, filed on Sep. 21, 2023.

(51) Int. Cl.

*H04N 19/44* (2014.01)
*H04N 19/169* (2014.01)
*H04N 19/70* (2014.01)

(52) U.S. Cl.

CPC ........... *H04N 19/44* (2014.11); *H04N 19/188* (2014.11); *H04N 19/70* (2014.11)

(58) Field of Classification Search

CPC ....... H04N 19/44; H04N 19/188; H04N 19/70
See application file for complete search history.

(56) References Cited

U.S. PATENT DOCUMENTS

2012/0075436 A1 3/2012 Chen et al.
2015/0271513 A1 9/2015 Hendry et al.
2017/0111661 A1 4/2017 Boyce
2021/0227232 A1 7/2021 Oh et al.
2022/0217387 A1 7/2022 Wang

OTHER PUBLICATIONS

International Search Report issued Nov. 20, 2024 in International Application No. PCT/US2024/047616.
Written Opinion of the International Searching Authority issued Nov. 20, 2024 in International Application No. PCT/US2024/047616.

*Primary Examiner* — Maria E Vazquez Colon
(74) *Attorney, Agent, or Firm* — Sughrue Mion, PLLC

(57) ABSTRACT

A method and apparatus comprising computer code configured to cause a processor or processors to obtain video data comprising at least one coded picture, identify, by a decoder, at least one first supplementary information enhancement (SEI) message type included with the video data and from a plurality of SEI message types that is required to be processed by the decoder, and the first SEI message type is selected based on a value of a profile indicator; and decode, by the decoder, the video data based on the first SEI message type.

20 Claims, 7 Drawing Sheets

100
101
102
103
104
105
Network

FIG. 3

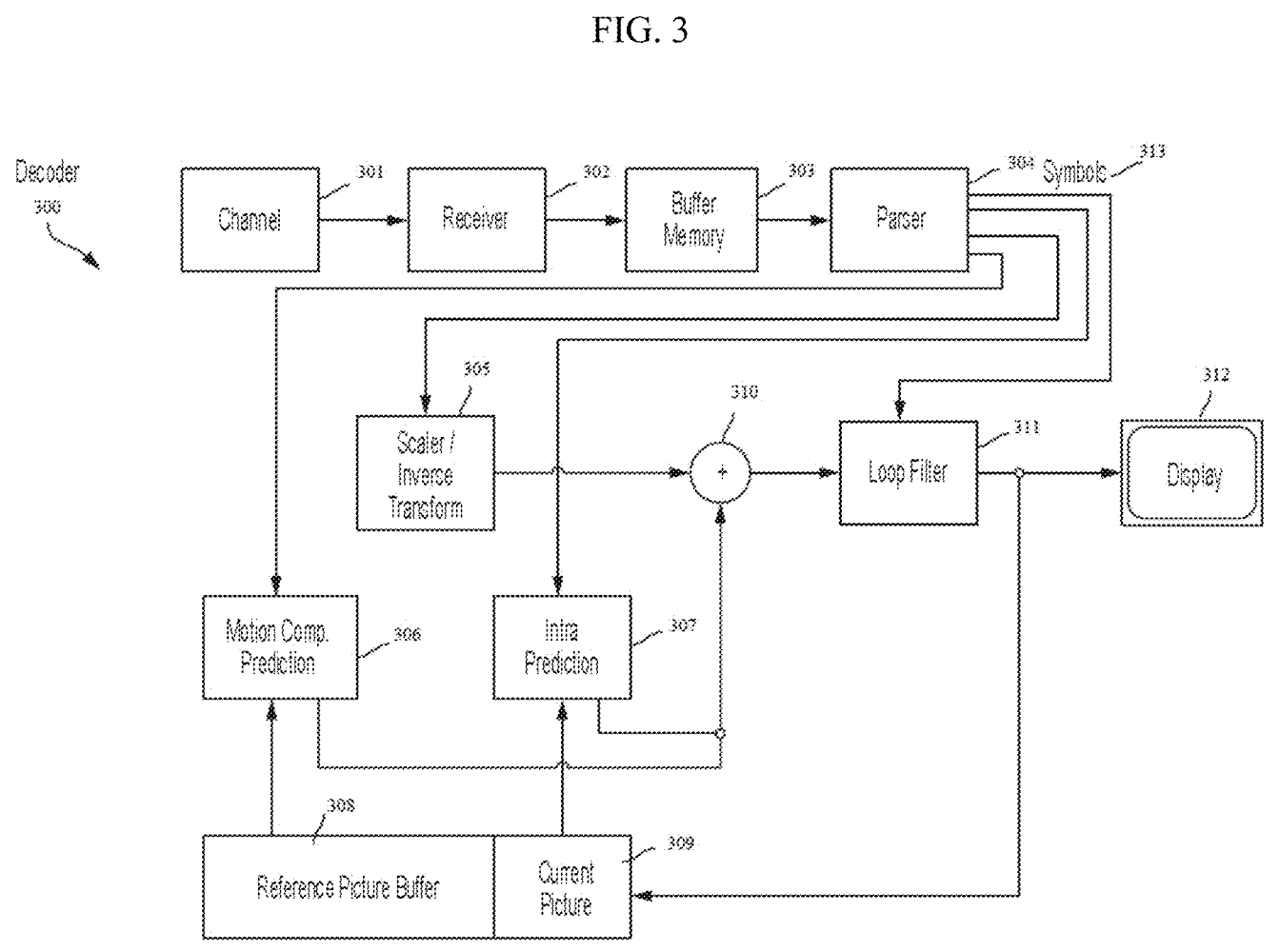

Decoder 300
Channel 301
Receiver 302
Buffer Memory 303
Parser 304
Symbols 313
Scaler / Inverse Transform 305
Motion Comp. Prediction 306
Intra Prediction 307
Reference Picture Buffer 308
Current Picture 309
310
Loop Filter 311
Display 312

700
CPU
GPU
FPGA
Accl.
System Bus
Graphics Adapter
Network Interface
741
742
783
744
748
747
745
746
740
717
750
751
701
703
702
705
706
707
708
709
710
711
720
722
723
799
798
749

REQUIRED SUPPLEMENTARY ENHANCEMENT INFORMATION MESSAGES THROUGH PROFILE

CROSS REFERENCE TO RELATED APPLICATION

This application claims priority to U.S. provisional application 63/539,776, filed on Sep. 21, 2023, the disclosure of which is incorporated herein by reference in its entirety.

BACKGROUND

1. Field

The disclosed subject matter relates to video coding and decoding, and more specifically, to Supplementary Enhancement Information (SEI) messages that are made mandatory to process in a receiver through a value of a profile indicator.

2. Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be described below.

Some video codec specifications use a profile indication, for example an integer value indicating the profile in use, in control structures such as a sequence parameter set, so to select the video coding tools allowed in a compliant bitstream from a superset of video coding tools allowed by the video coding specification syntax and semantics.

Some video codecs support Supplementary SEI messages. Historically, SEI messages are not required for the decoding of sample values, and in most cases could be ignored by the decoder without harming the decoding process, although the user experience might suffer.

SUMMARY

There is included a method and apparatus comprising memory configured to store computer program code and a processor or processors configured to access the computer program code and operate as instructed by the computer program code. The computer program is configured to cause the processor implement obtaining code configured to cause the at least one processor to obtain video data including at least one coded picture; identify, by a decoder, at least one first supplementary information enhancement (SEI) message type included with the video data and from a plurality of SEI message types that is required to be processed by the decoder, wherein the first SEI message type is selected based on a value of a profile indicator; and decode, by the decoder, the video data based on the first SEI message type.

The profile indicator may indicate a video coding for machine (VCM) profile.

Obtaining the video data may include obtaining the video data from a bitstream including NAL units including the a plurality of SEI messages.

The bitstream may identify at least some the SEI messages of the NAL units as VVC test model (VTM) bitstream SEIs and at least some other of the SEI messages of the NAL units as not VTM bitstream SEIs.

The value of the profile indicator may indicate whether the VTM bitstream SEI are required for decoding the video data.

The value of the profile indicator may indicate whether the at least one first SEI message type must be processed by the decoder.

The value of the profile indicator may indicate whether the at least one first SEI message type is to be ignored by the decoder.

BRIEF DESCRIPTION OF THE DRAWINGS

Further features, nature, and various advantages of the disclosed subject matter will be more apparent from the following detailed description and the accompanying drawings in which:

FIG. 3 is a simplified illustration of decoding in accordance with embodiments;

DETAILED DESCRIPTION

The proposed features discussed below may be used separately or combined in any order. Further, the embodiments may be implemented by processing circuitry (e.g., one or more processors or one or more integrated circuits).

In one example, the one or more processors execute a program that is stored in a non-transitory computer-readable medium.

In the context of the video coding for machines project ongoing in JVET and MPEG, a mechanism is required that maintains the basic syntax structure of video codec specifications such as Versatile Video Coding (H.266/VVC), can enhance the syntax of the video codec ideally without involving a change in the syntax of H.266 itself (or, at least not in a major way), and still allows changes in the decoding process.

Figure 1:
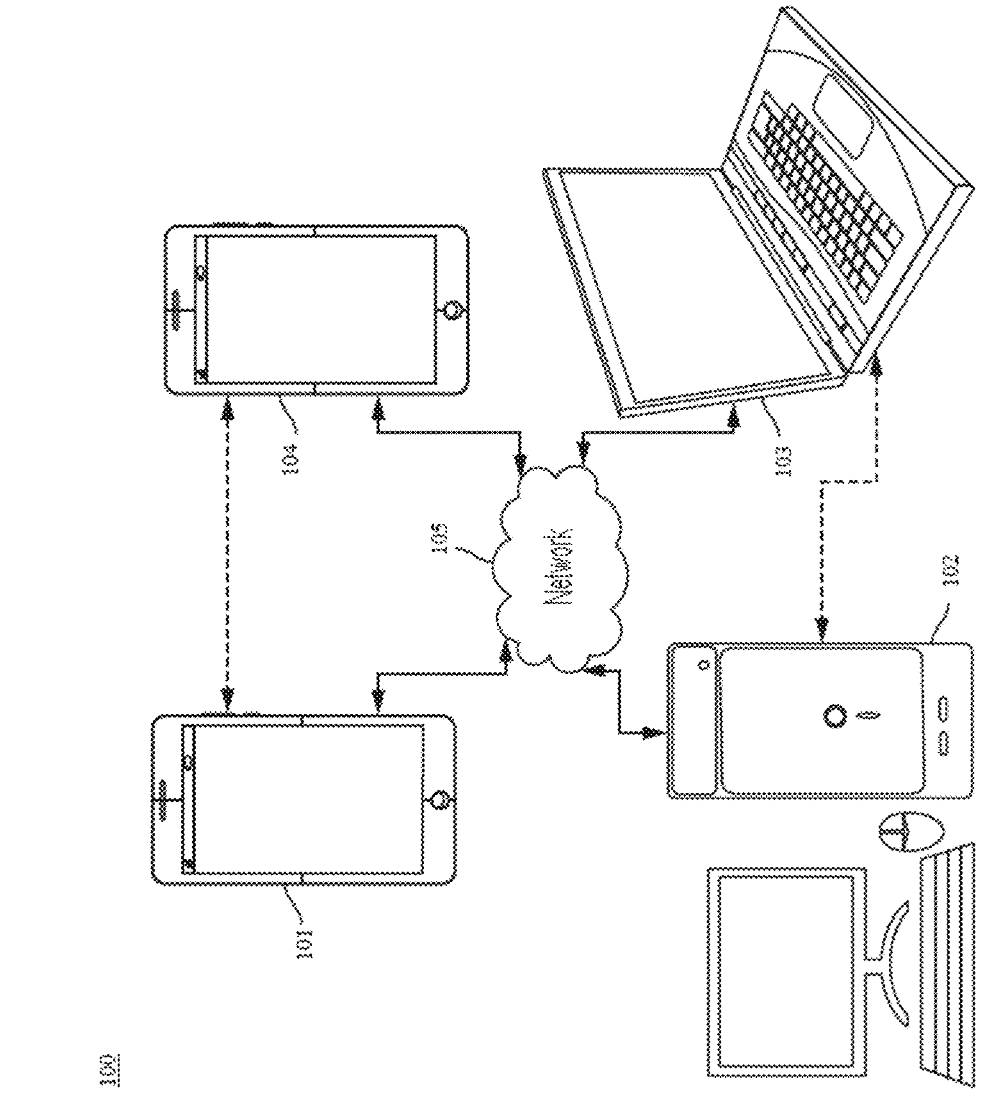
FIG. 1 is a schematic illustration of a computer environment in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below. The network 105 may include Media Aware Network Elements (MANEs) that may be included in the transmission path between, for example, terminal 101 and 104. The purpose of a MANE may be selective forwarding of parts of the media data to react to network congestions, media switching, media mixing, archival, and similar tasks commonly performed by a service provider rather than an end user. Such MANEs may be able to parse and react on a limited part of the media conveyed over the network, for example syntax elements related to the network abstraction layer of video coding technologies or standards.

Figure 2:
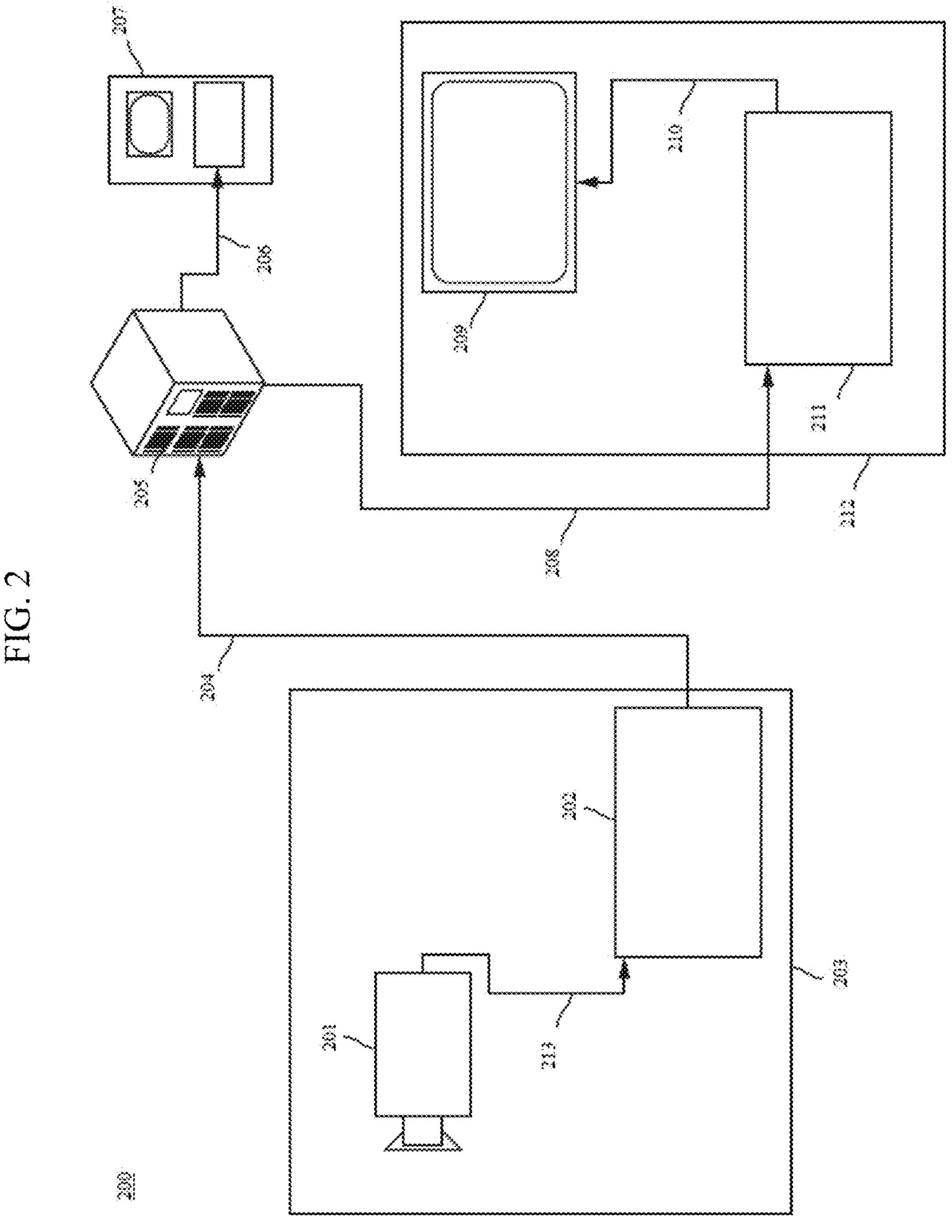
FIG. 2 is a simplified block diagram of media processing in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein. Examples of those standards include ITU-T Recommendations H.265 and H.266. The disclosed subject matter may be used in the context of VVC.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.266. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
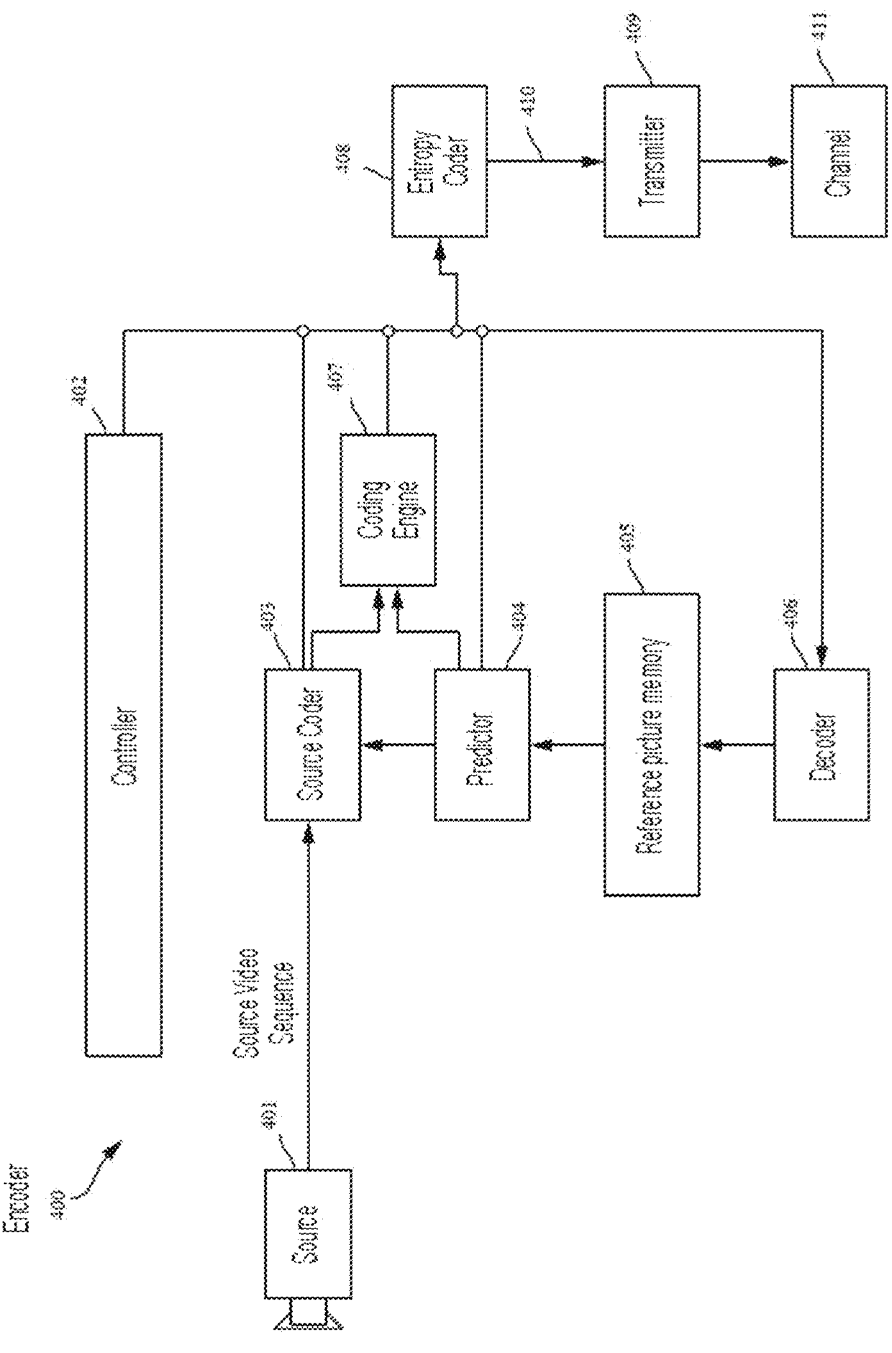
FIG. 4 is a simplified illustration of encoding in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 400 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture memory 405, which may be for example a cache. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the source coder 403, which may be for example a video coder, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the source coder 403 with other data to be transmitted, for example, coded audio data and/or ancillary data streams (sources not shown).

The controller 402 may manage operation of the encoder 400. During coding, the controller 402 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The encoder 400, which may be for example a video coder, may perform coding operations according to a predetermined video coding technology or standard, such as ITU-T Rec. H.266. In its operation, the encoder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Compressed video can be augmented, in the video bitstream, by supplementary enhancement information, for example in the form of Supplementary Enhancement Information (SEI) Messages or Video Usability Information (VUI). Video coding standards can include specifications parts for SEI and VUI. SEI and VUI information may also be specified in stand-alone specifications that may be referenced by the video coding specifications.

Figure 5:
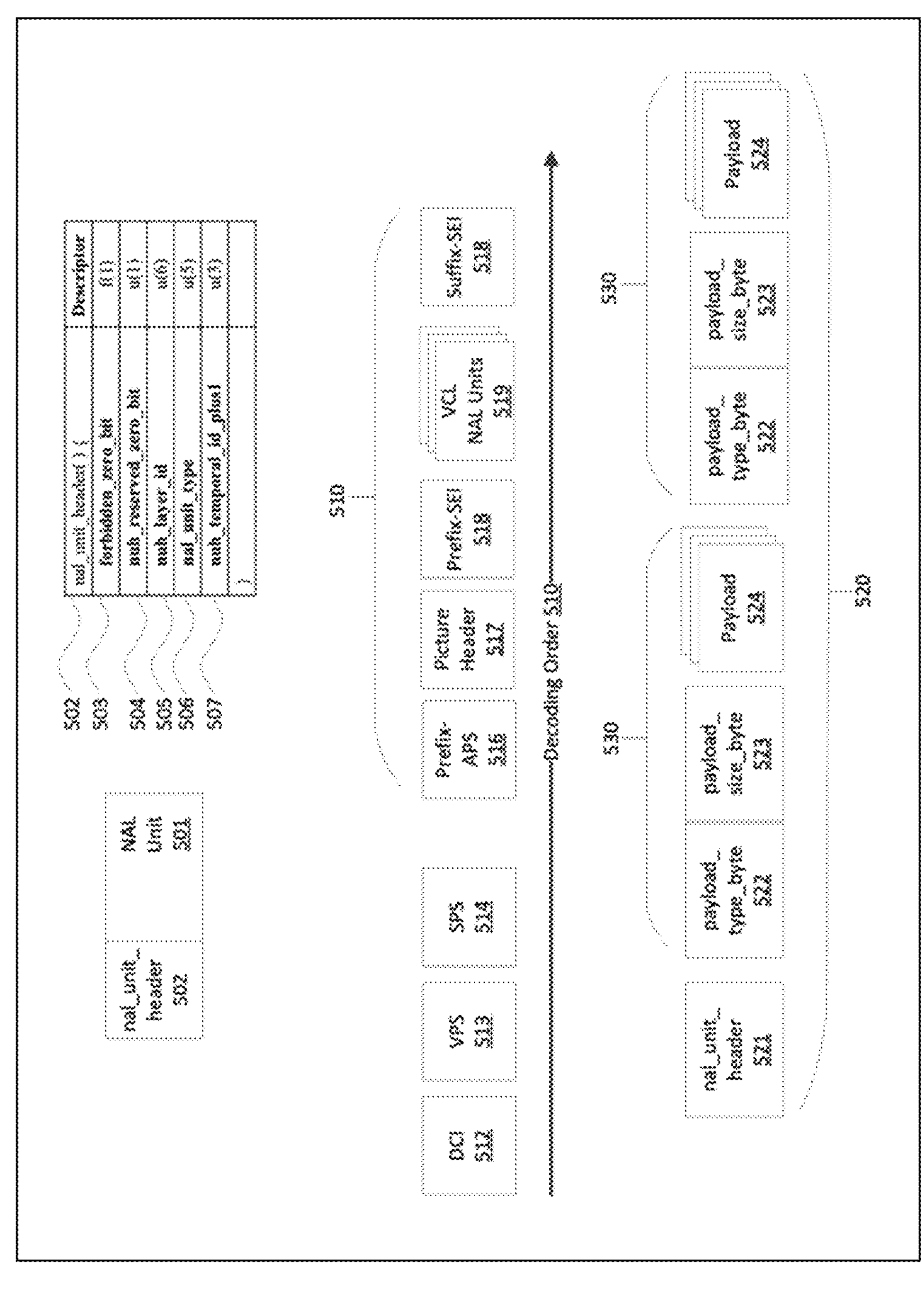
FIG. 5 is a simplified illustration of NAL unit and SEI headers in accordance with embodiments.

Referring to the example 500 of FIG. 5, shown is an exemplary layout of a Coded Video Sequence (CVS) in accordance with H.266. The coded video sequence is subdivided into Network Abstraction Layer units (NAL units). An exemplary NAL unit 501 can include a NAL unit header 502, which in turn comprises 16 bits as follows: a forbidden_zero_bit 503 and nuh_reserved_zero_bit 504 may be unused by H.266 and may be zero in a NAL unit. compliant with H.266. Three bits of nuh_layer_id 505 may be indicative of the (spatial, SNR, or multiview enhancement) layer to which the NAL unit belongs. Five bits of nuh_nal_unit_type define the type of NAL unit. In H.266, 22 NAL unit type values are defined for NAL unit types defined in H.266, six NAL unit types are reserved, and four NAL unit type values are unspecified and can be used by specifications other than H.266. Finally, three bits of the NAL unit header indicate the temporal layer to which the NAL unit belongs nuh_temporal_id_plus1 506.

A coded picture may contain one or more Video Coding Layer (VCL) NAL units and zero or more non-VCL NAL units. VCL NAL units may contain coded data conceptually belonging to a video coding layer as introduced before. Non-VCL NAL units may contain data conceptually belonging data not conceptually belonging to the video coding layer. Using H.266 as an example, they can be categorized into (1) Parameter sets, (2) Picture Header (PH_NUT), (3) NAL units, (4) Prefix and Suffix SEI Nal unit types (PREFIX_SEI_NUT and SUFFIX_SEI_NUT), (5) Filler Data NAL unit type FD_NUT, and (6) Reserved and Unspecified NAL unit types, as follows.

(1) Parameter sets, which comprise information that can be necessary for the decoding process and can apply to more than one coded picture. Parameter sets and conceptually similar NAL units may be of NAL unit types such as DCI_NUT (Decoding Capability Information (DCI)), VPS_NUT (Video Parameter Set (VPS), establishing, among other things, layer relationships), SPS_NUT (Sequence Parameter Set (SPS), establishing, among other things, parameters used and staying constant throughout a coded video sequence CVS), PPS_NUT (Picture Parameter Set (PPS), establishing, among other things, parameter used and staying constant within a coded picture), and PREFIX_APS_NUT and SUFFIX_APS_NUT (prefix and suffix Adaptation Parameter Sets). Parameter sets may include information required for a decoder to decode VCL NAL units, and hence are referred here as "normative" NAL units.

(2) Picture Header (PH_NUT), which is also a "normative" NAL unit.

(3) NAL units marking certain places in a NAL unit stream. Those include NAL units with the NAL unit types AUD_NUT (Access Unit Delimiter), EOS_NUT (End of Sequence) and EOB_NUT (End of Bitstream). These are non-normative, also known as informative, in the sense that a compliant decoder does not require them for its decoding process, although it needs to be able to receive them in the NAL unit stream.

(4) Prefix and Suffix SEI Nal unit types (PREFIX_SEI_NUT and SUFFIX_SEI_NUT) which indicate NAL units containing Prefix and Suffix supplementary enhancement information. In H.266, those NAL units are informative, as they are not required for the decoding process.

(5) Filler Data NAL unit type FD_NUT indicates filler data; data that can be random and can be used to "waste" bits in a NAL unit stream or bitstream, which may be necessary for the transport over certain isochronous transport environments.

(6) Reserved and Unspecified NAL unit types.

Still referring to FIG. 5, shown is a layout of a NAL unit stream in decoding order 510 containing a coded picture 511 containing NAL units of some of the types previously introduced. Somewhere early in the NAL unit stream, DCI 512, VPS 513, and SPS 514 may, in combination, establish the parameters which the decoder can use to decode the coded pictures of a coded video sequence (CVS), including coded picture 511 of the NAL unit stream.

The coded picture 511 can contain, in the depicted order or any other order compliant with the video coding technology or standard in use (here: H.266): a Prefix APS 516, Picture header (PH) 517, prefix SEI 518, one or more VCL NAL units 519, and suffix SEI 520.

Prefix and suffix SEI NAL units 518 and 520 were motivated during the standards development as, for some SEI messages, the content of the message would be known before the coding of a given picture commences, whereas other content would only be known once the picture were coded. Allowing certain SEI messages to appear early or late in a coded picture's NAL unit stream through prefix and suffix SEIs allows avoiding buffering. As one example, in an encoder the sampling time of a picture to be coded is known before the picture is coded, and hence the picture timing SEI message can be a prefix SEI message 516. On the other hand, a decoded picture hash SEI message, which contains a hash of the sample values of a decoded pictures and can be useful, for example, to debug encoder implementations, is a suffix SEI message 518 as an encoder cannot calculate a hash over reconstructed samples before a picture has been coded. The location of Prefix and Suffix SEI NAL units may not be restricted to their position in the NAL unit stream. The phrase "Prefix" and "Suffix" may imply to what coded pictures or NAL units the Prefix/Suffix SEI message may pertain to, and the details of this applicability may be specified, for example in the semantics description of a given SEI message.

Still referring to FIG. 5, show is a simplified syntax diagram of a NAL unit that contains a prefix or suffix SEI message 520. This syntax is a container format for multiple SEI messages that can be carried in one NAL unit. Details of the emulation prevention syntax specified in H.266 are omitted here for clarity. As other NAL units, SEI NAL units start with a NAL unit header 521. The header is followed by one or more SEI messages; two are depicted 530, 531 and described henceforth. Each SEI message inside the SEI NAL unit includes an 8 bit payload_type_byte 522 which specifies one of 256 different SEI types; an 8 bit payload_size_byte 523 which specifies the number of bytes of the SEI payload, and payload_size-byte number of bytes Payload 524. This structure can be repeated until a payload_type_byte equal to 0xff is observed, which indicates the end of the NAL unit. The syntax of the Payload 524 depends on the SEI message, it can be of any length between 0 and 255 bytes.

In the video coding for machines project in MPEG, one approach has been that a intra codec different from H.266 IRAP picture coding mechanism (known as "VTM codec") would be employed that allows to utilize, for example, AI-based techniques. As the samples reconstructed by that VTM codec can be used for prediction of other pictures coded in the bitstream, the reconstruction process must be processed by a decoder configured for the VTM codec. Traditionally, doing so would require standardizing the VTM codec in the JVET process as an integral part of H.266, and create a new profile where that intra codec replaces the existing IRAP coding mechanisms of H.266. For a number of procedural and policy reasons, the relevant projects in MPEG and JVET have decided not to pursue such an approach. Accordingly, a mechanism is needed that incurs only minimal changes in the VVC syntax but allows the inclusion of the VTM codec's syntax into a VVC bitstream.

In an embodiment, the VTM codec's bitstream can be included in one or more SEI messages configured for that purpose. Details of such an inclusion may be based on a format that splits the NAL units created/consumed by the VTM codec into fragments that can be handled by H.266's SEI message syntax (which may have a size limit for its payload, for example 255 bytes), and appropriate fragmentation and aggregation rules to recreate the sub-bitstream used by the VTM codec to/from the SEI messages.

What remains as a problem is that, according to the current H.266 specifications, SEI messages are not used for the decoding of sample information. That runs contrary to the concept that the samples reconstructed from the SEI messages carrying the VTM codec sub-bitstream are used to reconstruct the H.266 inter/B pictures.

Figure 6:
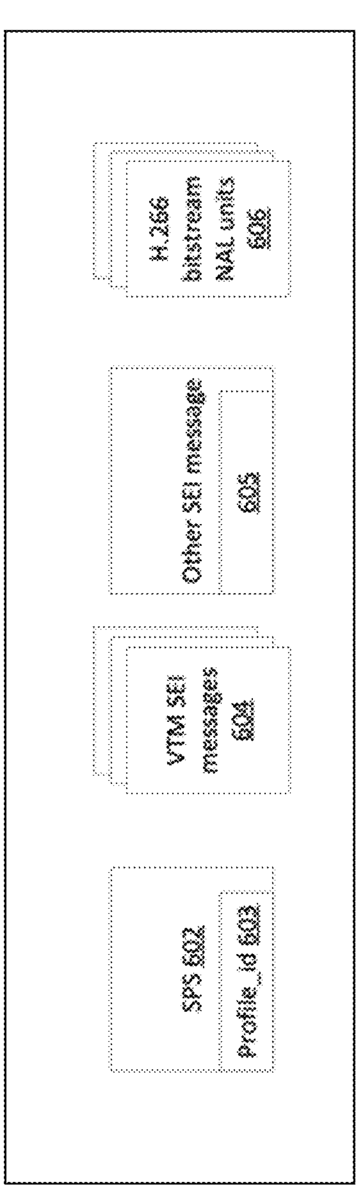
FIG. 6 is a schematic illustration of a bitstream containing a required and a non-required SEI message in accordance with an embodiment.

Referring to the example 600 of FIG. 6, in the same or another embodiment, an H.266 bitstream may include a parameter set 602, for example a sequence parameter set, including a profile indicator 603 referring to a VCM profile. The bitstream may include NAL units including SEI messages with an identifier labelling them as VTM bitstream SEIs 604 as well as NAL unit(s) including SEI message(s) 605 of a type that are not VTM bitstream SEIs, and for which H.266's usual rules for SEI messages apply-including the rule that they are not required for the decoding process of sample values. Other NAL units 606 may include the H.266 bitstream. The value of the profile indicator 603 may indicate that the VTM bitstream SEI are required for the decoding process by the VTM codec, and for the decoding of the whole bitstream that includes both the VTM-coded intra pictures and the H.266-coded inter pictures. If the profile indicator 603 has a pre-determined value indicative of a VTM codec SEI message, the related SEI message must be processed by the decoder and specifically by the VTM decoder. If the profile indicator 603 has a different value, then the normal operation rules for SEI messages can apply, meaning that the VTP bitstream SEI messages can be ignored by the decoder even if they are included in the bitstream.

Using the VTM encoder bitstream as a possible payload for a required SEI message is an example only. A similar mechanism could be used for technologies unrelated to VCM. For example, it is possible to carry an enhancement layer conforming to a codec different from H.266 in a required SEI message similarly to the VTM-coded pictures in the VTM-coded SEI message.

The techniques, such as for Required Supplementary Enhancement Information messages through Profile, described above, can be implemented as computer software using computer-readable instructions and physically stored in one or more computer-readable media or by a specifically configured one or more hardware processors. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
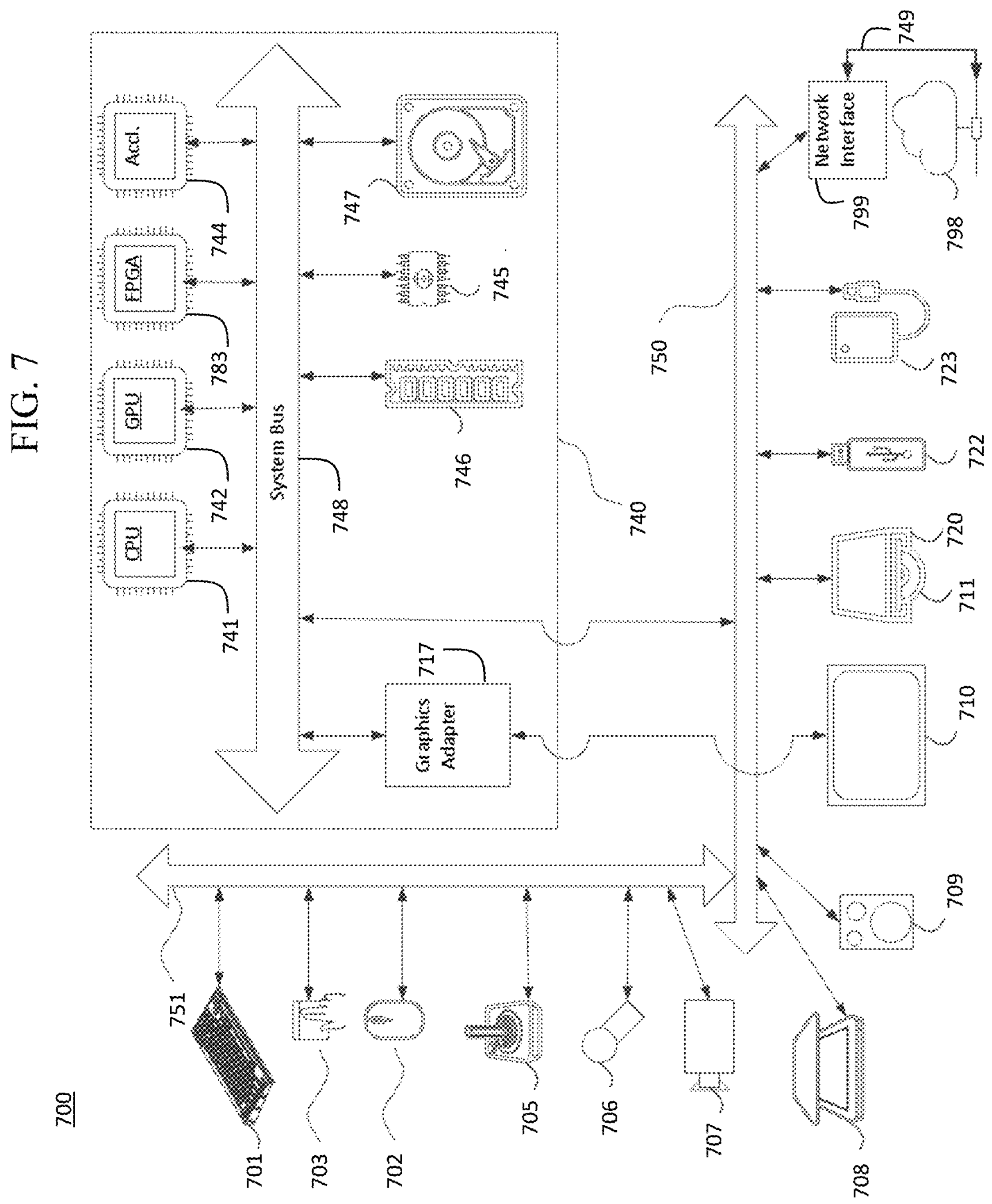
FIG. 7 is a simplified diagram of computer features in accordance with embodiments.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, joystick 705, microphone 706, scanner 708, camera 707.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD 711 or the like media, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface 799 to one or more communication networks 798. Networks 798 can for example be wireless, wireline, optical. Networks 798 can further be local, wide-area, metropolitan, vehicular and industrial, real-time, delay-tolerant, and so on. Examples of networks 798 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 798 commonly require external network interface adapters that attached to certain general-purpose data ports or peripheral buses (750 and 751) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks 798, computer system 700 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, a graphics adapter 717, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieval to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method comprising:

obtaining video data comprising at least one coded picture;

identifying, by a decoder, at least one first supplementary information enhancement (SEI) message type included with the video data and from a plurality of SEI message types that is required to be processed by the decoder, wherein the first SEI message type is selected based on a value of a profile indicator; and decoding, by the decoder, the video data based on the first SEI message type.

2. The method according to claim 1, wherein the profile indicator indicates a video coding for machine (VCM) profile.

3. The method according to claim 1, wherein obtaining the video data comprises obtaining the video data from a bitstream including NAL units including the plurality of SEI messages.

4. The method according to claim 3, wherein the bitstream identifies at least some of the SEI messages of the NAL units as VVC test model (VTM) bitstream SEIs and at least some other of the SEI messages of the NAL units as not VTM bitstream SEIs.

5. The method according to claim 4, wherein the value of the profile indicator indicates whether the VTM bitstream SEI are required for decoding the video data.

6. The method according to claim 1, wherein the value of the profile indicator indicates whether the at least one first SEI message type must be processed by the decoder.

7. The method according to claim 1, wherein the value of the profile indicator indicates whether the at least one first SEI message type is to be ignored by the decoder.

8. An apparatus for video decoding, the apparatus comprising:

at least one memory configured to store computer program code;

at least one processor configured to access the computer program code and operate as instructed by the computer program code, the computer program code including:

obtaining code configured to cause the at least one processor to implement obtaining video data comprising at least one coded picture;

identifying code configured to cause the at least one processor to implement identifying, by a decoder, at least one first supplementary information enhancement (SEI) message type included with the video data and from a plurality of SEI message types that is required to be processed by the decoder, wherein the first SEI message type is selected based on a value of a profile indicator; and decoding code configured to cause the at least one processor to implement decoding, by the decoder, the video data based on the first SEI message type.

9. The apparatus according to claim 8, wherein the profile indicator indicates a video coding for machine (VCM) profile.

10. The apparatus according to claim 8, wherein obtaining the video data comprises obtaining the video data from a bitstream including NAL units including the plurality of SEI messages.

11. The apparatus according to claim 10, wherein the bitstream identifies at least some of the SEI messages of the NAL units as VVC test model (VTM) bitstream SEIs and at least some other of the SEI messages of the NAL units as not VTM bitstream SEIs.

12. The apparatus according to claim 11, wherein the value of the profile indicator indicates whether the VTM bitstream SEI are required for decoding the video data.

13. The apparatus according to claim 8, wherein the value of the profile indicator indicates whether the at least one first SEI message type must be processed by the decoder.

14. The apparatus according to claim 8, wherein the value of the profile indicator indicates whether the at least one first SEI message type is to be ignored by the decoder.

15. A non-transitory computer readable medium storing a program causing a computer to:

obtain video data comprising at least one coded picture;

identify, by a decoder, at least one first supplementary information enhancement (SEI) message type included with the video data and from a plurality of SEI message types that is required to be processed by the decoder, wherein the first SEI message type is selected based on a value of a profile indicator; and decode, by the decoder, the video data based on the first SEI message type.

16. The method according to claim 15, wherein the profile indicator indicates a video coding for machine (VCM) profile.

17. The method according to claim 15, wherein obtaining the video data comprises obtaining the video data from a bitstream including NAL units including the plurality of SEI messages.

18. The method according to claim 17, wherein the bitstream identifies at least some of the SEI messages of the NAL units as VVC test model (VTM)

bitstream SEIs and at least some other of the SEI messages of the NAL units as not VTM bitstream SEIs.

19. The method according to claim 18, wherein the value of the profile indicator indicates whether the VTM bitstream SEI are required for decoding the video data.

20. The method according to claim 15, wherein the value of the profile indicator indicates whether the at least one first SEI message type must be processed by the decoder.

* * * * *